United States Patent Office 2,795,592
Patented June 11, 1957

2,795,592

SUBSTITUTED TETRAHYDROFURFURAL AND SUBSTITUTED TETRAHYDROFURFURYL ALCOHOL

John C. Hillyer, Bartlesville, Okla., assignor to Phillips Petroleum Company, a corporation of Delaware No Drawing. Application December 4, 1953,
Serial No. 396,321

27 Claims. (Cl. 260—346.2)

This invention relates to saturated and monoolefinic polycyclic aldehydes and alcohols as new compounds, and to their preparation. In one aspect this invention relates to 2,3,4,5-bis(butylene)tetrahydrofurfural and derivatives thereof as new compounds. In another aspect this invention relates to 2,3,4,5-bis(butylene)tetrahydrofurfuryl alcohol and derivatives thereof as new compounds. In another aspect this invention relates to the preparation of 2,3,4,5-bis(butylene)tetrahydrofurfural and derivatives thereof by reacting 2,3,4,5-bis($\Delta^2$-butenylene)tetrahydrofurfural or derivatives thereof under conditions effecting reduction of the olefinic double bonds therein. In another aspect this invention relates to the preparation of 2,3,4,5-bis(butylene)tetrahydrofurfuryl alcohol and derivatives thereof by reacting 2,3,4,5-bis-($\Delta^2$-butenylene)tetrahydrofurfural or derivatives thereof under conditions causing reduction of the olefinic and aldehydic double bonds therein. In another aspect this invention relates to preparation of saturated polycyclic alcohols by reaction of defined unsaturated polycyclic alcohols and saturated polycyclic aldehydes under conditions to reduce all double bonds therein.

In accordance with this invention, I have provided new polycyclic compounds, each characterized by one of the structural formulas selected from the group consisting of:

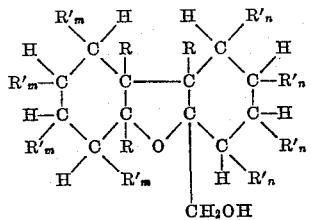

Formula I

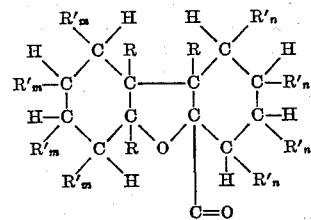

Formula II

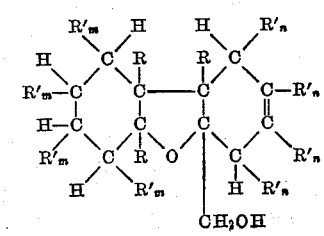

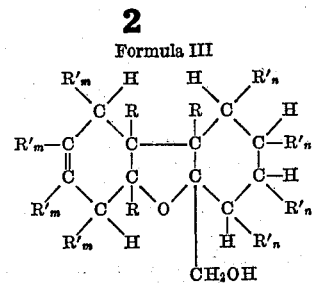

Formula III

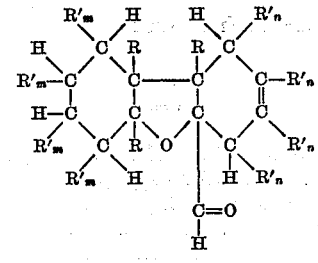

Formula IV and

Formula V

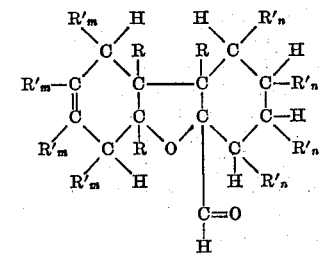

Formula VI wherein each R is a radical selected from the group consisting of hydrogen and methyl and at least one R is hydrogen, wherein each R' is a radical selected from the group consisting of hydrogen and an alkyl group having not more than three carbon atoms, wherein the sum of the carbon atoms in the R'$_m$ and R'$_n$ radicals is in each case not greater than three and wherein at least two of the R'$_m$ and at least two of the R'$_n$ radicals are hydrogen.

When all R's and R"s in Formula I are hydrogen, the new compound of this invention is 2,3,4,5-bis(butylene) tetrahydrofurfuryl alcohol; when all R's and R"s in Formula II are hydrogen, the new compound is 2,3,4,5-bis-(butylene)tetrahydrofurfural; when all R's and R"s in Formula III are hydrogen, the new compound is 2,3-($\Delta^2$-butenylene)-4,5-(butylene)tetrahydrofurfuryl alcohol; when all R's and R"s in Formula IV are hydrogen, the new compound is 2,3-(butylene)-4,5-($\Delta^2$-butenylene) tetrahydrofurfuryl alcohol; when all R's and R"s in Formula V are hydrogen, the new compound is 2,3-($\Delta^2$-butenylene)-4,5-(butylene)tetrahydrofurfural; and when all R's and R"s in Formula VI are hydrogen, the new compound is 2,3-(butylene)-4,5-($\Delta^2$-butenylene)tetrahydrofurfural.

In accordance with another concept of this invention a process is provided which comprises reacting a diolefinic polycyclic aldehyde characterized by the structural formula

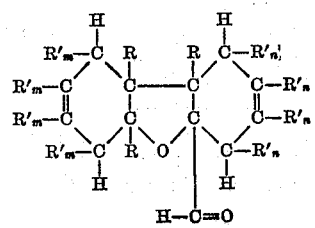

and/or a compound having a formula of a corresponding unsaturated compound product of said reactant, wherein in the first said structural formula each R is a radical selected from the group consisting of hydrogen and methyl and at least one R is hydrogen, wherein each R' is a radical selected from the group consisting of hydrogen and an alkyl group having not more than three carbon atoms, wherein the sum of the carbon atoms in the R'$_m$ and R'$_n$ radicals is in each case not greater than three and wherein at least two of the R'$_m$ and at least two of the R'$_n$ radicals are hydrogen, under reducing conditions so as to effect hydrogenation of at least one of its double bonds, in accordance with which process each of the new compounds of this invention can be produced; i. e., at least one of the olefinic double bonds alone or together with the aldehyde group,

undergo reduction. The diolefinic polycyclic aldehyde reactant, and a method for its preparation, are disclosed and claimed in the copending application of John C. Hillyer and Daniel A. Nicewander, Serial No. 81,413, filed March 14, 1949, now Patent No. 2,683,151, issued July 6, 1954.

In accordance with one concept of this invention, the defined diolefinic polycyclic aldehyde reactant is reacted with free hydrogen so as to effect hydrogenation of only one of the olefinic double bonds therein to produce a monoolefinic polycyclic aldehyde compound of this invention such as 2,3-($\Delta^2$-butenylene)-4,5-(butylene)tetrahydrofurfural and/or 2,3-(butylene)-4,5-($\Delta^2$-butenylene)tetrahydrofurfural referred to hereinabove.

In accordance with another concept, the defined diolefinic polycyclic aldehyde is reacted with free hydrogen so as to effect hydrogenation of only one of the olefinic double bonds therein, and is then reacted under reducing conditions in the substantial absence of free hydrogen so as to reduce the aldehyde group, CH=O to an alcohol group, to produce a corresponding monoolefinic polycyclic alcohol compound of this invention, such as 2,3-($\Delta^2$-butenylene)-4,5-(butylene)tetrahydrofurfuryl alcohol and/or 2,3-(butylene)-4,5-($\Delta^2$-butenylene)tetrahydrofurfuryl alcohol, above referred to.

In accordance with another concept, the defined diolefinic polycyclic aldehyde reactant is reacted with free hydrogen so as to effect hydrogenation of both the olefinic double bonds therein, to produce a corresponding saturated polycyclic aldehyde compound of this invention, such as 2,3,4,5-bis(butylene)tetrahydrofurfural, referred to hereinabove.

In accordance with another concept, the defined olefinic polycyclic aldehyde reactant is reacted first with free hydrogen so as to effect hydrogenation of both olefinic double bonds therein and, is thereafter reacted in the substantial absence of free hydrogen under conditions so as to reduce the aldehyde group, CH=O, therein, to produce a corresponding saturated polycyclic alcohol compound of this invention, such as 2,3,4,5-bis-(butylene)tetrahydrofurfuryl alcohol referred to hereinabove.

In accordance with another concept, the defined diolefinic polycyclic aldehyde reactant is reacted with free hydrogen under conditions so as to effect hydrogenation of all double bonds therein, i. e., the olefinic double bonds and the aldehydic double bond.

When reacting the diolefinic polycyclic aldehyde reactant in accordance with this invention to reduce an olefinic double bond therein by reaction with free hydrogen and also to effect reduction of the aldehyde group in the substantial absence of free hydrogen, the hydrogenation of the olefinic double can be hydrogenated prior to, or subsequent to, reduction of the aldehyde group, as desired.

Diolefinic polycyclic alcohols, disclosed and claimed in my copending application Serial No. 255,520, filed November 8, 1951, now Patent No. 2,687,419 (1954), which can be prepared by reduction of the aldehyde group of the above defined diolefinic polycyclic aldehyde reactant of this invention, as disclosed in the said copending application, can be employed as a starting material in the process of this invention in the preparation of a monoolefinic and/or saturated polycyclic alcohol.

The new monoolefinic and/or saturated polycyclic aldehydes disclosed and claimed herein can be employed as starting materials in a process of this invention for the preparation of monoolefinic and/or saturated polycyclic alcohols.

In the preparation of the saturated aldehyde product, the defined diolefinic polycyclic aldehyde reactant can be reacted in liquid phase with free hydrogen in the presence of a suitable hydrogenation catalyst at a temperature approximating room temperature such as the range of about 20–40° C., often from about 25 to 30° C., although temperatures above 40° C. and below 20° C. can be employed. Any suitable pressure can be employed in carrying out this reaction, the preferred pressure being within the range of 5–100 p. s. i. g., a pressure of from 30–40 p. s. i. g. generally being advantageously employed. Under these reaction conditions the aldehyde group in the said diolefinic polycyclic aldehyde reactant remains unreacted.

In the preparation of the saturated aldehyde product in accordance with this embodiment it is preferred to employ a solvent for the reaction although the use of a solvent is not required. Suitable solvents are those chemically inert to the catalyst employed and to the reactant material and reaction products, among which solvents are methyl alcohol, ethyl alcohol, isopropyl alcohol, dioxane, methyl cyclopentane, and the like. It is preferred that the solvent employed dissolve both the starting materials and the end products.

Hydrogenation to produce the saturated aldehyde product in accordance with this embodiment, is preferably continued until substantially no further reaction occurs as manifested by constant hydrogen pressure in the hydrogenation zone upon no further hydrogen being added.

Upon termination, the catalyst is recovered such as by filtration and the saturated aldehyde product is separated from the reaction mixture for recovery, preferably by distillation, although crystallization or other suitable separation and recovery means can be employed.

In the catalytic hydrogenation of the polycyclic aldehyde reactant to produce the saturated aldehyde product, palladium is a presently preferred catalyst; however, any suitable catalyst can be employed such as platinum, nickel, Raney nickel, and the like. Although the catalyst can be employed per se, it is preferably employed as a supported catalyst, i. e., supported on any suitable support means such as kieselguhr, alumina, activated charcoal, and the like. The catalyst can be employed in any suitable amount although generally an amount of catalyst within the range of from 2 to 25 parts by weight per 100 parts by weight of the diolefinic polycyclic aldehyde reactant are employed, preferably from 3 to 10 parts of catalyst, these proportions of catalyst being particularly applicable to the hydrogenation of 2,3,4,5-bis-($\Delta^2$ - butenylene)tetrahydrofurfural to produce 2,3,4,5 - bis(butylene)tetrahydrofurfural. However, in any event, when desired, proportions of catalyst below 2 and above 25 parts per weight per 100 parts by weight of the diolefinic polycyclic aldehyde reactant can be employed.

When desired, conditions can be chosen whereby the diolefinic polycyclic aldehyde reactant can be reacted with free hydrogen so as to hydrogenate only one of the olefinic double bonds therein. Thus, when carrying out the above described embodiment the hydrogenation can be terminated short of completion whereby product is formed containing the corresponding monoolefinic product, from which the latter can be recovered.

In the preparation of the saturated polycyclic alcohol product of this invention from a mono or diolefinic polycyclic aldehyde reactant, the catalytic procedure above described with reference to catalytic hydrogenation of the olefinic double bonds of the unsaturated polycyclic aldehyde product, can be employed, whether before or after reduction of the aldehyde group of the reactant compound. However, when the said olefinic double bonds and the aldehyde group are to be reduced at the same time, i. e., by reaction of both the olefinic double bonds and the aldehyde group with free hydrogen, hydrogenation temperatures and pressures are employed which are more severe than those utilized when effecting hydrogenation of only the olefinic double bonds therein. Thus, when hydrogenating the unsaturated polycyclic aldehyde reactant to produce a saturated alcohol product a pressure of from 50 to 500 p. s. i. g., preferably 200–400 p. s. i. g., is advantageously employed, together with temperatures in the range of 25–175° C., generally a temperature of 85–100° C. being advantageously utilized. Any suitable hydrogenation catalyst can be employed in carrying out this embodiment, illustrative of which are those named hereinabove with reference to the catalytic hydrogenation of an unsaturated aldehyde to form the corresponding saturated aldehyde product.

On reacting the unsaturated aldehyde reactant with free hydrogen under conditions to effect hydrogenation of both the olefinic double bonds and the aldehyde group, under which conditions of reaction hydrogenation is incomplete, a mixture of the saturated alcohol and saturated aldehyde is obtained. Thus, in carrying out this embodiment, i. e., a one-step hydrogenation with free hydrogen, there is an initial relatively rapid absorption of hydrogen, followed by a relatively slow take-up of hydrogen due to the relatively high rate of hydrogenation of the olefinic double bonds in the reactant, and, if the reaction is stopped prior to hydrogenation of all aldehyde groups, the said mixture of saturated aldehydes and alcohols is obtained. This mixture can be resolved into its separate product components by any suitable means, such as by fractional distillation.

When effecting reaction of the saturated or unsaturated polycyclic aldehyde reactant in the absence of free hydrogen, so as to reduce the CH=O group to the corresponding alcohol group any suitable procedure can be employed. Thus, the said reaction can be carried out in accordance with the well known Cannizzaro reaction, the crossed Cannizzaro reaction, reaction with a metal borohydride or reaction with iron and aqueous acetic acid.

When employing the crossed Cannizzaro reaction, as described, one procedure involves agitation and heating during agitation, of a mixture of the selected aldehyde reactant, i. e., a monoolefinic, diolefinic or saturated polycyclic aldehyde reactant of the process of this invention, with potassium or sodium hydroxide, an aqueous solution of a low-molecular weight aldehyde and a low-molecular weight alcohol under time conditions to permit reduction of the aldehyde group to proceed to substantial completion. The alcohol solvent is then removed under vacuum, water is added, and the corresponding alcohol product of reaction is separated from the reaction mixture by any suitable means such as by extraction followed by distillation or crystallization from the extract.

In carrying out the above described embodiment employing the crossed Cannizzaro reaction, a temperature range of 40–100° C. is generally satisfactory, 50–70° C. being preferred. However, temperatures below 40° C. and above 100° C., can be employed.

Any suitable aldehyde reactant can be employed in carrying out the above described crossed Cannizzaro reaction, for example formaldehyde or acetaldehyde. For each mol of aldehyde reduced, at least one mol of potassium or sodium hydroxide and at least one mol of the added aldehyde are used.

Any suitable metallic hydride can be employed in effecting reduction of the CH=O group of the unsaturated polycyclic aldehyde reactant to the corresponding alcohol group, exemplary of which are sodium borohydride ($NaBH_4$), lithium aluminum hydride ($LiAlH_4$) and lithium borohydride ($LiBH_4$).

In accordance with one embodiment employing a metal hydride to effect reduction of the aldehyde group in the saturated or unsaturated polycyclic aldehyde reactant, solution of the aldehyde reactant in a suitable solvent such as methyl alcohol, is added with external cooling, to a solution of alkali metal borohydride dissolved in a low-molecular weight alcohol such as methyl alcohol. Reaction involving reduction of the said aldehyde group proceeds at about room temperature. Subsequent to reaction, water is added to the reaction mixture and after removal of alcohol solvent the residual water mixture is contacted with a suitable extraction solvent, for example, isooctane, or if desired, other immiscible solvents such as benzene, pentane, carbon tetrachloride, and the like. Product is then separated from the resulting solvent phase. Although temperatures employed in carrying out this embodiment as from 20–30° C., are generally satisfactory, temperatures as high as 50° C. and as low as 10° C. can be satisfactorily employed. For effecting complete reduction of the aldehyde radical of the reactant polycyclic aldehyde, one mol of the metal hydride is employed for every four mols of the aldehyde reactant. Preferably a small excess of metal hydride is present. Any suitable solvent can be employed, sodium borohydride being advantageously employed in conjunction with water or methyl alcohol solvents and lithium aluminum hydride being necessarily employed in conjunction with nonhydroxylic solvents, with the further requirement that it be protected from moisture.

The saturated and monoolefinic polycyclic aldehydes and alcohols of this invention have utility as rubber and resin plasticizers, chemical intermediates and bactericides, and, exhibit especial utility as insect repellent,[1] particularly as repellents of biting flies, house flies, cockroaches, ticks, mosquitoes and the like. These compounds as insect repellents are employed per se or in any suitable form such as in solution, emulsion, as an aerosol, fog, dust, or the like, to a surface frequented by insects.

EXAMPLE 1

*Preparation of 2,3,4,5-bis($\Delta^2$-butenylene)tetrahydrofurfural*

A sample of furfural containing 5 weight percent water and 10 weight percent butadiene based on total reactor charge was heated in a steel reaction chamber for 70 hours at a temperature of 230° F. Unchanged reactants and butadiene dimer were stripped after which the higher boiling portion was fractionated under reduced pressure. A yield of 30.8 parts of purified product by weight per 100 parts of butadiene charged was obtained under these conditions. The weight of desired product was 95 percent of the total weight of unpurified product obtained. Substantially all the remaining butadiene was recovered either as such or as the dimer.

EXAMPLE 2

*Preparation of 2,4,3,5-bis($\Delta^2$-butenylene)tetrahydrofurfuryl alcohol from 2,3,4,5-bis($\Delta^2$-butenylene)tetrahydrofurfural by Cannizzaro reaction*

A run was made wherein 250 grams of potassium hydroxide was dissolved in 375 ml. of methyl alcohol and

---

[1] Please see the co-pending application of Lyle D. Goodhue and James T. Edmonds, Jr., Serial No. 399,615, filed December 21, 1953, in which is disclosed and claimed a method for repelling insects employing the said saturated polycyclic aldehydes and polycyclic alcohols as repellents, and repellents containing these compounds as an essential active ingredient.

the solution so formed added with stirring over a period of 30 minutes to 306 grams of 2,3,4,5-bis($\Delta^2$-butenylene)-tetrahydrofurfural, said 2,3,4,5-bis($\Delta^2$-butenylene)tetrahydrofurfural being dissolved in 150 ml. of 40 weight percent aqueous formaldehyde and 400 ml. of methyl alcohol. Temperature of the reaction mixture during said addition was maintained at about 60° C. for 3 hours after the addition was completed. Methanol was removed by vacuum distillation and 450 ml. of water was then added. Phase separation occurred, the bottom layer being the aqueous layer. The top layer, containing most of the product, was removed. The bottom layer was extracted with three 200 ml. portions of benzene. The benzene extract and the top layer were combined and washed with five 50 ml. portions of water. Benzene was removed by vacuum distillation to provide 275.1 grams of crude 2,3,4,5 - bis($\Delta^2$ - butenylene)tetrahydrofurfuryl alcohol. The crude alcohol was a light yellow, viscous liquid which slowly crystallized on standing at room temperature (25° C).

The crude product was distilled under vacuum to provide 2,3,4,5-bis($\Delta^2$-butenylene)tetrahydrofurfuryl alcohol which was a white crystalline solid.

Values obtained on material prepared by this procedure are as follows:

|  | Found | Calculated |
|---|---|---|
| Melting point, ° C | 33-35 |  |
| Refractive Index | $n_D^{30}$ 1.5335 |  |
| Hydroxyl Number | 259 | 272 |
| Bromine Number | 138 | 155 |
| Molecular Weight | 218 | 206 |
| Carbon Content | 73.42 | 75.73 |
| Hydrogen Content | 8.71 | 8.74 |
| Oxygen (by difference) | 17.87 | 15.53 |

The 2,4-dinitrobenzoate derivative had a melting point of 75–77° C.

EXAMPLE 3

*Preparation of 2,3,4,5-bis($\Delta^2$-butenylene)tetrahydrofurfuryl alcohol by reaction of 2,3,4,5-bis($\Delta^2$-butenylene)-tetrahydrofurfural with sodium borohydride*

A solution of 204 grams of 2,3,4,5-bis($\Delta^2$-butenylene)-tetrahydrofurfural in 200 ml. of methyl alcohol was added to a solution of 15 grams of sodium borohydride in 200 ml. of methyl alcohol, while maintaining the temperature of the reaction mixture in the range of 0 to 10° C. After allowing the reaction mixture to set for 48 hours at room temperature, 200 grams of water was added, and the methyl alcohol was removed by evaporation on a steam bath. The aqueous mixture was extracted with isooctane, and the isooctane solution was distilled to yield 163 g. of a product boiling at 110° C. at 0.2 mm. of Hg. Upon crystallization, it was found to melt at 32–33° C. Its mixed melting point of 31–33° C. with the product of Example 2 showed it to be 2,3,4,5-bis($\Delta^2$-butenylene)-tetrahydrofurfuryl alcohol.

EXAMPLE 4

*Preparation of 2,3,4,5 - bis(butylene)tetrahydrofurfuryl alcohol by reduction of the unsaturated alcohol with hydrogen in the presence of palladium*

32.4 grams (0.157 mol) of 2,3,4,5-bis($\Delta^2$-butenylene)-tetrahydrofurfuryl alcohol, prepared by the method described in Example 2, was dissolved in 50 ml. of ethyl alcohol. To this was added one gram of Baker & Co.'s commercial hydrogenation catalyst consisting of 10 percent palladium on activated charcoal. The resulting mixture was placed in the glass container of a Parr hydrogenation apparatus. Hydrogen was introduced into the container at room temperature and at pressures between 19 and 40 p. s. i. g. until absorption of the hydrogen had almost ceased. During the entire hydrogenation procedure, the container and its contents were shaken constantly. A total of 0.287 mol of hydrogen was used. This is 91.5 percent of the theoretical amount required for reduction of two double bonds. The catalyst was removed from the reaction mixture by filtration, and the filtrate was distilled. A product which boiled at 125° C. at 0.7 mm. of Hg formed crystals which, after being recrystallized from a mixture of ethyl alcohol and water, melted at 66–68° C. (uncorrected). 18.5 g. of recrystallized material was obtained. A mixed melting point with the thrice recrystallized compound melting at 67–69° C. obtained in Example 6 was 67–68° C., indicating that the material is 2,3,4,5-bis(butylene)tetrahydrofurfuryl alcohol.

EXAMPLE 5

*Preparation of 2,3,4,5-bis(butylene)tetrahydrofurfural by reduction of 2,3,4,5-bis($\Delta^2$-butenylene)tetrahydrofurfural with hydrogen in the presence of palladium*

22.0 grams of 2,3,4,5-bis($\Delta^2$-butenylene)tetrahydrofurfural and about 1 gram of Baker & Co.'s commercial hydrogenation catalyst consisting of 10 percent palladium on activated charcoal were added to 50 ml. of ethyl alcohol, and the resultant mixture was placed in the glass container of a Parr hydrogenation apparatus. Hydrogen was introduced into the container at room temperature and at pressures below 40 pounds per square inch until hydrogen absorption had practically ceased. During the hydrogenation procedure, the container and its contents were shaken constantly. The catalyst was removed from the reaction mixture by filtration, and the filtrate was distilled under reduced pressure after the ethyl alcohol had been removed. A product which boiled at 95–99° C. at 0.5 mm. Hg formed crystals which melted, after recrystallization from ethyl alcohol, at 58–58.5° C. 15.9 grams of this product, 2,3,4,5-bis(butylene)tetrahydrofurfural was obtained. It gave a positive test for the presence of an aldehyde group when tested with fuchsin aldehyde reagent. It formed a derivative with 2,4-dinitrophenylhydrazine melting at 183–184° C.

EXAMPLE 6

*Preparation of 2,3,4,5 - bis(butylene)tetrahydrofurfural and 2,3,4,5-bis(butylene)tetrahydrofurfuryl alcohol by reduction of 2,3,4,5-bis($\Delta^2$-butenylene)tetrahydrofurfural with hydrogen in the presence of nickel*

A mixture of 506 grams of 2,3,4,5-bis($\Delta^2$-butenylene)-tetrahydrofurfural, 260 grams of ethyl alcohol, and 8 grams of Girdler Corporation's commercial nickel on kieselguhr catalyst was placed in a high pressure rocking hydrogenation apparatus. Hydrogen was introduced, and the charge was reduced at 150 to 200° F. and 200 to 400 p. s. i. g. of hydrogen pressure until the absorption of hydrogen became noticeably slower. The reduction was discontinued after about 4 hours and 15 minutes, and the catalyst was removed from the reaction mixture by filtration. The filtrate, after removal of the alcohol, was distilled under reduced pressure. Approximately half of the product distilled at 117° C. at 1.6 mm. Hg, and the other half at 134° C. at 1.6 mm. Hg.

The lower-boiling product formed crystals which, when recrystallized from a solvent, melted at 53–55° C. A test with fuchsin aldehyde reagent showed the presence of an aldehyde group. It formed a derivative with 2,4-dinitrophenylhydrazine melting at 180–181° C., which gave a mixed melting point of 179–180° C. with the 2,4-dinitrophenylhydrazine derivative of the product obtained by the reduction of 2,3,4,5-bis($\Delta^2$-butenylene)tetrahydrofurfural over palladium in a Parr hydrogenation at room temperature, described in Example 5. The compound is 2,3,4,5-bis(butylene)tetrahydrofurfural.

The material boiling at 134° C. at 1.6 mm. Hg formed crystals which melted at 64–68° C. A mixed melting point with the product obtained in Example 4 was 64–66° C. The material was recrystallized three times from benzene. Its melting point was 67–69° C. A mixed melting point with the product obtained in Example 4 was 67–68° C. A test for the presence of an aldehyde group was negative. The compound is 2,3,4,5-bis(butylene)-tetrahydrofurfuryl alcohol.

The total yield of this reduction was 476 grams, consisting of 251 grams of 2,3,4,5-bis(butylene)tetrahydrofurfural and 225 grams of 2,3,4,5-bis(butylene)tetrahydrofurfuryl alcohol.

EXAMPLE 7

*Preparation of 2,3,4,5-bis(butylene)tetrahydrofurfuryl alcohol from 2,3,4,5-bis(butylene)tetrahydrofurfural by crossed Cannizzaro reaction*

100 grams of the 2,3,4,5-bis(butylene)tetrahydrofurfural obtained in Example 6 was dissolved in 125 ml. of methyl alcohol and mixed with 83 grams of potassium hydroxide. The resulting mixture was treated with a solution of 50 ml. of 40 percent aqueous formaldehyde in 200 ml. of methyl alcohol at 60° C. for four hours and fifteen minutes. The methyl alcohol was then removed under partial vacuum, 150 ml. of water was added, and the reduced 2,3,4,5-bis(butylene)tetrahydrofurfural was removed by extraction with 350 ml. of benzene. Impurities were removed from the benzene by extraction with water. The benzene was then distilled off under reduced pressure. The residue solidified to a crystalline product which was recrystallized from an ethyl alcohol-water mixture. Its melting point was 67–69° C., and a mixed melting point with the 2,3,4,5-bis(butylene)-tetrahydrofurfuryl alcohol obtained in Example 5 was 67–69° C. A yield of 83.5 grams was obtained.

Reasonable variation and modification are possible within the scope of the foregoing disclosure and the appended claims to the invention, the essence of which is that (1) monoolefinic and saturated polycyclic aldehydes and alcohols are provided as new compounds having especial utility as resin and rubber plasticizers, chemical intermediates, bactericides and insect repellents; (2) a method is provided for preparation of such compounds by reacting a defined diolefinic polycyclic aldehyde under reducing conditions so as to effect reduction of at least one of its double bonds; and (3) a method is provided for reacting a defined monoolefinic or a saturated polycyclic aldehyde or an unsaturated polycyclic alcohol under reducing conditions so as to effect reduction of at least one of the double bonds in the unsaturated aldehyde or alcohol reactant to produce the corresponding more saturated compound.

I claim:

1. A process comprising reacting a compound selected from the group consisting of a compound characterized by the structural formula

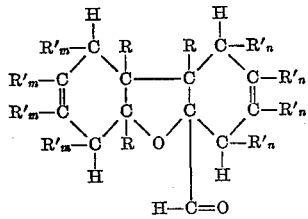

and a compound characterized by the structural formula of a corresponding unsaturated compound product of a reduction described herein wherein in the first said formula each R is a radical selected from the group consisting of hydrogen and methyl and at least one R is hydrogen, wherein each R' is a radical selected from the group consisting of hydrogen and an alkyl group having not more than three carbon atoms, wherein the sum of the carbon atoms in the $R'_m$ and $R'_n$ radicals is in each case not greater than three and wherein at least two of the $R'_m$ and at least two of the $R'_n$ radicals are hydrogen, with hydrogen under conditions so as to effect reduction of at least one of its double bonds, and recovering resulting product.

2. The process of claim 1 wherein a saturated aldehyde is formed as product.

3. The process of claim 1 wherein a saturated alcohol is formed as product.

4. The process of claim 1 wherein at least one olefinic double bond in said reactant compound remains unreacted.

5. A polycyclic compound characterized by a structural formula selected from the group consisting of:

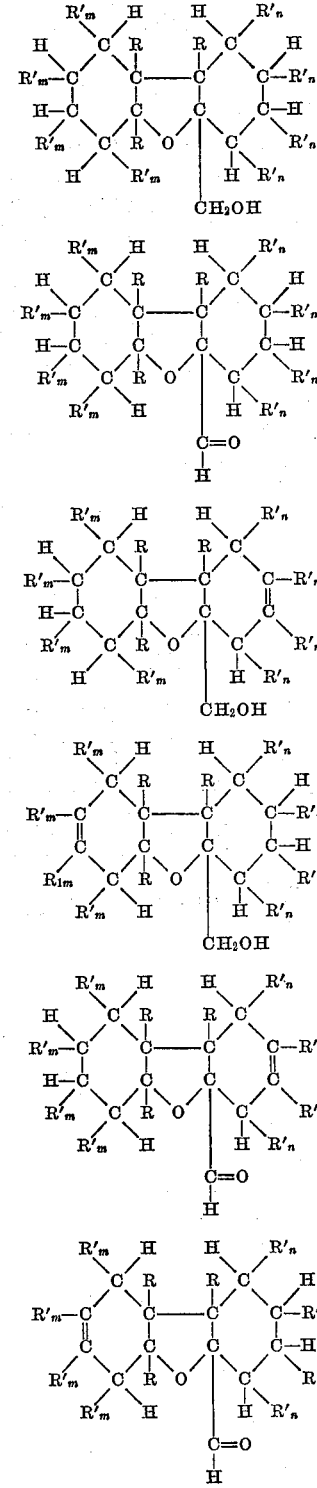

wherein each R is a radical selected from the group consisting of hydrogen and methyl and at least one R is hydrogen, wherein each R' is a radical selected from the group consisting of hydrogen and an alkyl group having not more than three carbon atoms, wherein the sum of the carbon atoms in the R'$_m$ and R'$_n$ radicals is in each case not greater than three and wherein at least two of the R'$_m$ and at least two of the R'$_n$ radicals are hydrogen.

6. A new compound 2,3,4,5-bis(butylene)tetrahydrofurfural.

7. A new compound 2,3,4,5-bis(butylene)tetrahydrofurfuryl alcohol.

8. A new compound 2,3-($\Delta^2$-butenylene)-4,5-(butylene)tetrahydrofurfuryl alcohol.

9. A new compound 2,3-(butylene)-4,5-($\Delta^2$-butenylene)tetrahydrofurfuryl alcohol.

10. A new compound 2,3-($\Delta^2$-butenylene)-4,5-(butylene)tetrahydrofurfural.

11. A process comprising reacting 2,3,4,5-bis($\Delta^2$-butenylene)tetrahydrofurfural with hydrogen so as to effect hydrogenation of at least one of its double bonds, and recovering resulting product.

12. A process comprising reacting 2,3,4,5-bis($\Delta^2$-butenylene)tetrahydrofurfural with hydrogen so as to effect hydrogenation only of its olefinic double bonds, and recovering 2,3,4,5-bis(butylene)tetrahydrofurfural as product.

13. A process comprising reacting 2,3,4,5-bis($\Delta^2$-butenylene)tetrahydrofurfural with hydrogen so as to effect hydrogenation of all of its double bonds, and recovering 2,3,4,5-bis(butylene)tetrahydrofurfuryl alcohol as product.

14. A process comprising reacting 2,3,4,5-bis($\Delta^2$-butenylene)tetrahydrofurfural in the absence of free hydrogen, under reducing conditions, so as to reduce its aldehyde group to an alcohol group and then reacting resulting 2,3,4,5-bis($\Delta^2$-butenylene)tetrahydrofurfuryl alcohol with hydrogen so as to hydrogenate its olefinic double bonds, and recovering 2,3,4,5-bis(butylene)tetrahydrofurfural alcohol as product.

15. A process comprising reacting 2,3,4,5-bis($\Delta^2$-butenylene)tetrahydrofurfural with hydrogen so as to hydrogenate only its olefinic double bond, and then reacting resulting 2,3,4,5-bis(butylene)tetrahydrofurfural under reducing conditions in the absence of free hydrogen so as to reduce the aldehyde group therein, and recovering 2,3,4,5-bis(butylene)tetrahydrofurfuryl alcohol as product.

16. The process of claim 12 wherein said reaction with hydrogen is conducted in the presence of a suitable hydrogenation catalyst.

17. The process of claim 16 wherein said hydrogenation is conducted in the presence of a catalyst selected from the group consisting of palladium, and nickel, at a temperature within the range of 20 to 40° C.

18. The process of claim 13 wherein said reaction with hydrogen is conducted in the presence of a suitable hydrogenation catalyst.

19. The process of claim 13 wherein said reaction with hydrogen is conducted in the presence of a hydrogenation catalyst at a temperature within the range of 25 to 175° C.

20. The process of claim 14 wherein reduction of said aldehyde group is effected in the presence of an alkali-metal hydroxide and in the presence of an aldehyde selected from the group consisting of formaldehyde and acetaldehyde.

21. The process of claim 15 wherein reduction of said aldehyde group is effected in the presence of an alkali-metal hydroxide and an aldehyde selected from the group consisting of formaldehyde and acetaldehyde.

22. The process of claim 14 wherein said 2,3,4,5-bis-($\Delta^2$-butenylene)tetrahydrofurfural is reacted with a metal borohydride to effect reduction of said aldehyde group.

23. The process of claim 15 wherein said aldehyde group is reduced in the presence of a metal borohydride.

24. A process comprising reacting 2,3,4,5-bis(butylene)tetrahydrofurfural under reducing conditions so as to reduce its aldehyde group to an alcohol group, and recovering the corresponding saturated alcohol product.

25. The process comprising reacting 2,3,4,5-bis($\Delta^2$-butenylene)tetrahydrofurfuryl alcohol with hydrogen so as to hydrogenate its olefinic double bonds, and recovering the corresponding saturated alcohol product.

26. The process of claim 24 wherein said 2,3,4,5-bis-(butylene)tetrahydrofurfural is reacted with an alkali-metal hydroxide and with aldehyde selected from the group consisting of formaldehyde and acetaldehyde.

27. The process of claim 24 wherein said 2,3,4,5-bis-(butylene)tetrahydrofurfural is reacted with a metal borohydride to reduce said aldehyde group.

References Cited in the file of this patent

UNITED STATES PATENTS

| | | |
|---|---|---|
| 2,572,577 | Tissol et al. | Oct. 23, 1951 |
| 2,687,419 | Hillyer | Aug. 24, 1954 |

OTHER REFERENCES

Dunlop: Ind. Eng. Chem., vol. 40, pp. 208–209 (1948).